Feb. 20, 1945.  J. L. JOHNSON  2,369,829
CAMERA SUPPORT
Filed Dec. 2, 1943

J. L. Johnson
INVENTOR.

BY *[signature]*
ATTORNEYS.

Patented Feb. 20, 1945

2,369,829

UNITED STATES PATENT OFFICE 2,369,829

CAMERA SUPPORT

John L. Johnson, Pinehurst, Wash.

Application December 2, 1943, Serial No. 512,660

1 Claim. (Cl. 95—12)

This invention relates to photography, and more particularly to a camera support, the primary object of the invention being to provide a camera support in the form of a harness which may be fitted on the head of a person, so that the camera supported thereby may be focused on the subject to be photographed, by the person wearing the support and camera, by merely looking directly at the subject, the head being necessarily held in a predetermined position.

Another object of the invention is to provide a device of this character which may be completely concealed by the hat worn by the person, to the end that a camera may be supported under the hat at all times, without inconvenience to the wearer, the camera being ready for instant use, eliminating the necessity of removing the camera from the head, and permitting the accurate photographing of the subject as viewed.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figures 1, 2:
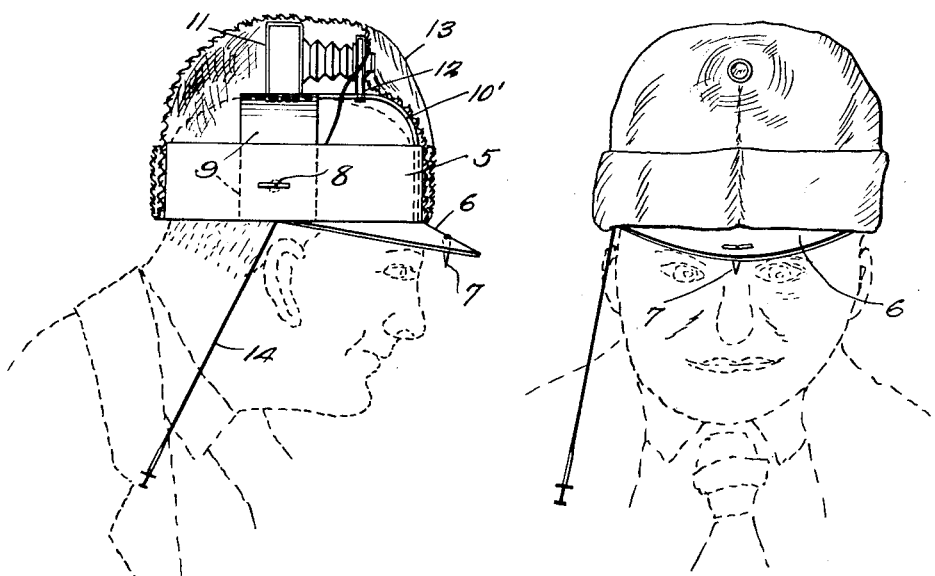
Figure 1 is an elevational view of a camera support constructed in accordance with the invention, and illustrating a camera as positioned on the support.
Figure 2 is a front elevational view illustrating a camera support and camera as in use, the lens of the camera being exposed through an opening in the hat.

Referring to the drawing in detail the support comprises a head band 5 which may be constructed of any suitable material such as canvas, leather or the like. A visor indicated by the reference character 6 extends forwardly from the band 5, the visor being so shaped, that the outer edge thereof, when the head band has been properly positioned, may be aligned with the subject to be photographed by moving the head to bring the front edge of the visor to the proper position in the line of sight. A pin indicated at 7 may be positioned in the visor, so that the lower end thereof extends an appreciable distance below the visor so that the free end of the pin may also be brought in alignment with the line of sight.

Secured to the head band 5, as by means of the pins 8 is the camera supporting frame, which embodies a transverse member 9 that has its ends curved downwardly as at 10, the lower ends of the member 9 terminating adjacent to the lower edge of the head band 5. Extending forwardly from the transverse member 9, is a member 10' which is also curved downwardly to fit over the forehead of the person wearing the camera support.

Figure 3:
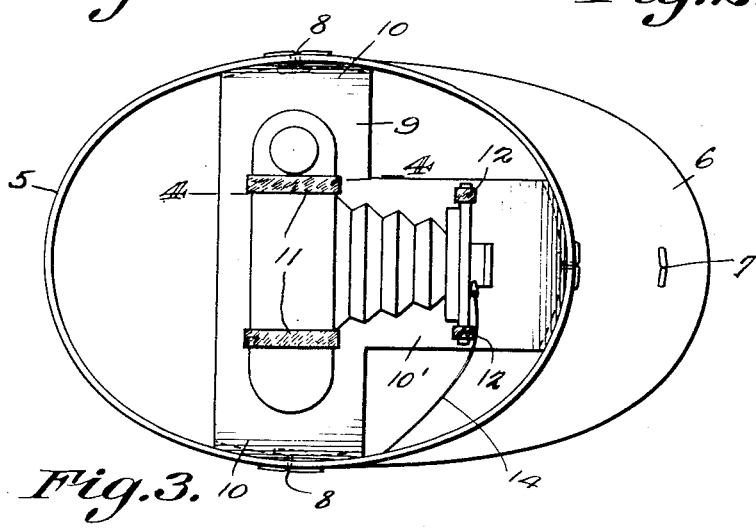
Figure 3 is a plan view of the camera support.
Figure 4:
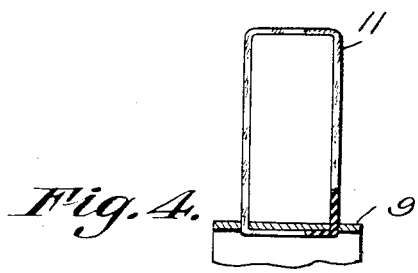
Figure 4 is a sectional view taken on line 4—4 of Figure 3.

Spaced elastic bands 11 are mounted on the transverse member 9, and are adapted to grip the body portion of the camera used with the support, as shown by Figure 3 of the drawing, whereupon the camera may be readily and easily removed and replaced. Elastic bands 12 are secured to the forwardly extended member 10', and are adapted to be positioned over the lens supporting section of the camera to hold the bellows of the camera, in its extended position or in a position to instantaneously snap a picture, when viewing an object.

The cap worn with the camera support, may be of any desired type, the cap in the present showing, being indicated by the reference character 13. The cap will be provided with an opening to permit the lens of the camera to be extended therethrough, so that light rays will have an unobstructed passage to the lens and film supported within the camera.

The reference character 14 designates the lens control mechanism, which may be in the form of a cable or bulb actuating mechanism.

On using the device, it will be obvious that a person wearing a camera mounted on a support as described, may, by merely looking at the subject to be photographed, with the head tilted to a predetermined angle, operate the shutter of the camera to take a picture as it is viewed by the person on whose head a camera is supported. When a camera is supported in this manner, the camera is ready for instant use and may be conveniently carried on the head of the person.

What is claimed is:

A camera support, adapted to be fitted on the head, comprising a head band, over which a flexible cover is positioned, a substantially rigid frame secured to the head band under said cover, said frame embodying curved members adapted to fit against the sides of the head of the wearer, flexible bands secured to the curved members and adapted to embrace portions of a camera positioned between the flexible cover and frame, said cover having an opening and the camera supported by the frame adapted to hold the cover in position above the frame, whereby said opening of the cover lies in direct alignment with the lens of the camera.

JOHN L. JOHNSON.